United States Patent
Ollila

(10) Patent No.: US 12,294,789 B2
(45) Date of Patent: May 6, 2025

(54) COMPLEMENTING WOBULATION IN STEREO CAMERAS

(71) Applicant: Varjo Technologies Oy, Helsinki (FI)

(72) Inventor: Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 162 days.

(21) Appl. No.: 18/357,609

(22) Filed: Jul. 24, 2023

(65) Prior Publication Data

US 2025/0039574 A1     Jan. 30, 2025

(51) Int. Cl.
| | |
|---|---|
| G06T 3/4069 | (2024.01) |
| H04N 1/393 | (2006.01) |
| H04N 1/40 | (2006.01) |
| H04N 13/00 | (2018.01) |
| H04N 13/204 | (2018.01) |
| H04N 23/45 | (2023.01) |
| H04N 23/60 | (2023.01) |
| H04N 23/951 | (2023.01) |
| H04N 25/441 | (2023.01) |
| H04N 25/47 | (2023.01) |
| H04N 25/48 | (2023.01) |
| H04N 25/75 | (2023.01) |

(52) U.S. Cl.
CPC ........... *H04N 25/48* (2023.01); *G06T 3/4069* (2013.01); *H04N 1/3935* (2013.01); *H04N 1/40068* (2013.01); *H04N 13/204* (2018.05); *H04N 23/45* (2023.01); *H04N 23/665* (2023.01); *H04N 23/951* (2023.01); *H04N 25/441* (2023.01); *H04N 25/47* (2023.01); *H04N 25/75* (2023.01); *G06T 2207/10012* (2013.01); *G06T 2207/10021* (2013.01); *H04N 2013/0088* (2013.01)

(58) Field of Classification Search
CPC ............ H04N 1/3935; H04N 1/40068; H04N 9/3188; H04N 13/00; H04N 13/204; H04N 23/45; H04N 23/665; H04N 23/95; H04N 23/951; H04N 25/441; H04N 25/47; H04N 25/48; H04N 25/75; H04N 2013/0088; G06T 3/4053; G06T 3/4069; G06T 2207/10012; G06T 2207/10021
See application file for complete search history.

(56) References Cited

U.S. PATENT DOCUMENTS

| | | | |
|---|---|---|---|
| 2015/0363913 A1* | 12/2015 | Higgins | ..................... G06T 5/50 |
| | | | 382/164 |
| 2023/0298192 A1* | 9/2023 | Banic | ..................... G06T 7/593 |
| | | | 382/106 |

* cited by examiner

*Primary Examiner* — Lin Ye
*Assistant Examiner* — Chriss S Yoder, III
(74) *Attorney, Agent, or Firm* — Ziegler IP Law Group, LLC.

(57) ABSTRACT

An imaging system is disclosed. In a cycle, two or three consecutive pairs of first sub-images and second sub-images are captured using a first image sensor and a second image sensor respectively, while wobulators are controlled to perform, during the cycle, one or two first sub-pixel shifts and one or two second sub-pixel shifts, respectively. A given first sub-pixel shift is performed in first direction, while a given second sub-pixel shift is performed in a second direction different from the first direction The first sub-images and the second sub-images of the cycle are processed, to generate a first image and a second image, respectively.

15 Claims, 6 Drawing Sheets

COMPLEMENTING WOBULATION IN STEREO CAMERAS

TECHNICAL FIELD

The present disclosure relates to imaging systems incorporating complementing wobulation in stereo cameras. Moreover, the present disclosure relates to methods incorporating complementing wobulation in stereo cameras.

BACKGROUND

Nowadays, with an increase in the number of images being captured every day, there is an increased demand for developments in image generation. Such a demand is quite high and critical in case of evolving technologies such as immersive extended-reality (XR) technologies which are being employed in various fields such as entertainment, real estate, training, medical imaging operations, simulators, navigation, and the like.

Several advancements are being made to develop image generation technology.

Conventional devices employ various equipment and techniques to generate high-resolution images. Some devices employ wobulation-based pixel shifting technology, wherein a sequence of images is captured while performing sub-pixel shifting of an image sensor. Multiple images in the sequence are then processed to generate a high-resolution image, for providing an apparent spatial super-resolution.

However, provision of high spatial resolutions for the images using wobulation-based pixel-shifting technology has certain problems associated therewith. Conventional devices employing the wobulation-based pixel-shifting technology require four or more images to be captured and processed to generate a single high-resolution image. This undesirably drastically reduces a frame rate of generating the images, for example, to one-fourth or even less. Moreover, capturing and processing image signals captured by pixels of the four or more images is highly computationally-intensive and time-consuming, and also requires very high computing power. Therefore, existing equipment and techniques employing the wobulation-based pixel-shifting technology are unable to cope with visual quality requirements, for example, such as a high resolution (such as a resolution higher than or equal to 60 pixels per degree), a small pixel size, a large field of view, and a high frame rate (such as a frame rate higher than or equal to 90 FPS) in some devices (such as XR devices).

Therefore, in light of the foregoing discussion, there exists a need to overcome the aforementioned drawbacks.

SUMMARY

The aim of the present disclosure is to provide an imaging system and a method to generate highly accurate and realistic stereo images, in computationally-efficient and time-efficient manner. The aim of the present disclosure is achieved by an imaging system and a method that incorporate complementing wobulation in stereo cameras using relatively lesser number of wobulation steps as compared to the prior art, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 5A and 5B illustrate how sub-pixel shifting is performed when capturing two sub-images from a given image sensor, while

FIG. 8A illustrates a part of a first sub-image of a pair, while FIG. 8B illustrates a part of a second sub-image of the pair, in accordance with an embodiment of the present disclosure.

DETAILED DESCRIPTION OF EMBODIMENTS

Figure 1:
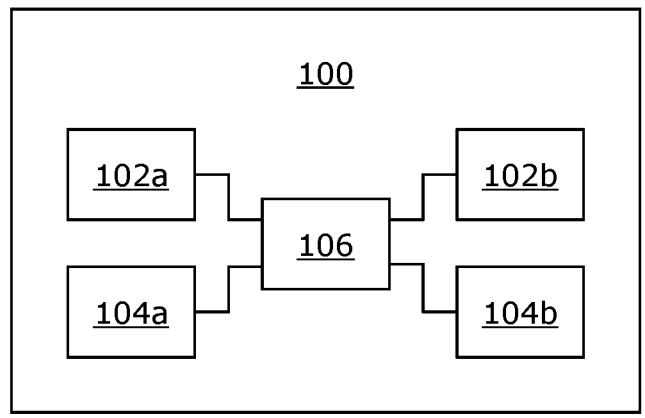
FIG. 1 illustrates a block diagram of an architecture of an imaging system incorporating complementing wobulation in stereo cameras, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an imaging system comprising:
  a first image sensor and a second image sensor, forming a stereo pair;
  a first wobulator and a second wobulator that are to be employed to perform sub-pixel shifts when capturing images with the first image sensor and the second image sensor, respectively; and
  at least one processor configured to:
    obtain, in a cycle, two or three consecutive pairs of first sub-images and second sub-images from the first image sensor and the second image sensor, respectively;

control the first wobulator and the second wobulator to perform, during said cycle, one or two first sub-pixel shifts and one or two second sub-pixel shifts, respectively, wherein a given first sub-pixel shift is performed in a first direction, while a given second sub-pixel shift is performed in a second direction that is different from the first direction; and process the first sub-images and the second sub-images of said cycle, to generate a first image and a second image, respectively.

In a second aspect, the present disclosure provides a method comprising:

obtaining, in a cycle, two or three consecutive pairs of first sub-images and second sub-images from a first image sensor and a second image sensor, respectively, wherein the first image sensor and the second image sensor form a stereo pair;

controlling a first wobulator and a second wobulator to perform one or two first sub-pixel shifts and one or two second sub-pixel shifts when capturing the first sub-images and the second sub-images during said cycle, respectively, wherein a given first sub-pixel shift is performed in a first direction, while a given second sub-pixel shift is performed in a second direction that is different from the first direction; and processing the first sub-images and the second sub-images of said cycle, to generate a first image and a second image, respectively.

The present disclosure provides the aforementioned imaging system and method incorporating complementing wobulation in stereo cameras to generate highly accurate and realistic first images and second images at an acceptably high frame rate as compared to the prior art, in computationally-efficient and time-efficient manner. Herein, instead of capturing and processing four or more sub-images (as in the prior art), only the two or three consecutive pairs of the first sub-images and the second sub-images (corresponding to the one or two first sub-pixel shifts and the one or two second sub-pixel shifts) are required to be captured and processed for generating acceptably accurate and realistic first images and second images constituting pairs of stereo images.

Additionally, employing the one or two first sub-pixel shifts and the one or two second sub-pixel shifts facilitate in providing acceptably high image quality (for example, in terms of a resolution, a high contrast, a high modulation transfer function (MTF) resolution, a low noise, and the like); and such images have minimal/no visible artifacts such as aliasing. The imaging system and the method are susceptible to cope with visual quality requirements, for example, such as a high resolution (such as a resolution higher than or equal to 60 pixels per degree), a small pixel size, and a large field of view, whilst achieving a high frame rate (such as a frame rate higher than or equal to 90 FPS). The imaging system and the method are simple, robust, fast, reliable, and can be implemented with ease.

It will be appreciated that the first image and the second image are generated in computationally-efficient and time-efficient manner, at an acceptably high (and controlled) frame rate, as compared to the prior art. This is because only the two or three consecutive pairs of the first sub-images and the second sub-images (corresponding to the one or two first sub-pixel shifts and the one or two second sub-pixel shifts) are required to be processed for generating acceptably accurate and realistic first image and second image, instead of processing four or more consecutive pairs of the first sub-images and the second sub-images, for which three or more first sub-pixel shifts and second sub-pixel shifts would need to be performed in the prior art. The frame rate is expressed in terms of frames per second (FPS), and may, for example, be 60 FPS, 90 FPS, 120 FPS, or higher. For example, when only one sub-pixel shift is performed pursuant to embodiments of the present disclosure, instead of conventional three sub-pixel shifts (as required in the prior art), a frame rate drops to only ½ instead of ¼. Similarly, when two sub-pixel shifts are performed instead of the conventional three sub-pixel shifts, the frame rate drops to only ⅓ instead of ¼. Additionally, employing the one or two first sub-pixel shifts and the one or two second sub-pixel shifts facilitate in providing sufficiently high and acceptably high image quality (for example, in terms of a high resolution, a high contrast, a high modulation transfer function (MTF) resolution, low noise, and the like), and also considerably reduces visibility of artifacts such as aliasing.

Throughout the present disclosure, the term "image sensor" refers to a device that detects light from a real-world environment at its photo-sensitive surface, thereby enabling a plurality of pixels arranged on the photo-sensitive surface to capture a plurality of image signals. The plurality of image signals are electrical signals pertaining to a real-world scene of the real-world environment. The plurality of image signals constitute image data of the plurality of pixels. Herein, the term "image data" refers to information pertaining to a given pixel arranged on the photo-sensitive surface of a given image sensor, wherein said information comprises one or more of: a colour value of the given pixel, a depth value of the given pixel, a transparency value of the given pixel, a luminance value of the given pixel. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. The term "given image sensor" encompasses the first image sensor and/or the second image sensor. Image sensors are well-known in the art.

Examples of the given image sensor include, but are not limited to, a charge-coupled device (CCD) image sensor, and a complementary metal-oxide-semiconductor (CMOS) image sensor. It will be appreciated that the plurality of pixels could, for example, be arranged in a rectangular two-dimensional (2D) grid, a polygonal arrangement, a circular arrangement, an elliptical arrangement, a freeform arrangement, or the like, on the photo-sensitive surface. In an example, the given image sensor may comprise 25 megapixels arranged in the rectangular 2D grid (such as a 5000×5000 grid) on the photo-sensitive surface.

Optionally, the first image sensor and the second image sensor are parts of a first camera and a second camera, respectively, wherein the first camera and the second camera are employed to capture the first sub-images and the second sub-images, respectively. It will be appreciated that a first sub-image of a given pair is captured from a perspective of one of a left eye and a right eye of a user, whereas the second sub-image of the given pair is captured from a perspective of another of the left eye and the right eye. In this regard, the first camera and the second camera may be arranged to face the real-world environment in a manner that a distance between the first camera and the second camera is equal to an interpupillary distance (IPD) between the left eye and the right eye. In an example, the distance between the first camera and the second camera may be equal to an average IPD. It will be appreciated that the first sub-image and the second sub-image together represents a same real-world scene of the real-world environment, but are slightly offset with respect to each other, owing to slightly different fields of view being captured in the first sub-image and the second sub-image. Optionally, a given camera is arranged on a teleport device present in the real-world environment. The term "teleport device" refers to a specialized equipment that is capable of facilitating virtual teleportation. It will be appreciated that the teleport device is stationary in the real-world environment, thereby facilitating the given camera to capture consecutive sub-images of the real-world scene, which are subsequently processed to generate an image. The term "given camera" encompasses the first camera and/or the second camera.

Optionally, the given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the at least one camera is implemented as a depth camera. Examples of the depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. The given camera is optionally implemented as a combination of the visible-light camera and the depth camera.

It will be appreciated that when capturing the two or three consecutive pairs of the first sub-images and the second sub-images, it is ensured that either the given camera (or the given image sensor) is capturing images of a static real-world environment (i.e., only stationary objects or their parts are present in the real-world environment), or a change in a relative pose between the given camera and a given object or its part present in the real-world environment is minimal/negligible. In this way, visual representation represented in the two or three consecutive pairs would be significantly similar, and thus it would be advantageous to generate the first image and the second image by processing the two or three consecutive pairs accordingly.

Optionally, the given camera comprises a Bayer colour filter array (CFA) arranged in front of the plurality of pixels of the photosensitive surface of the given image sensor. Such a Bayer CFA could be one of: a 4C Bayer CFA (also referred to as "quad" or "tetra", wherein a group of 2×2 pixels has a same colour), a 9C Bayer CFA (also referred to as "nona", wherein a group of 3×3 pixels has a same colour), a 16C Bayer CFA (also referred to as "hexadeca", wherein a group of 4×4 pixels has a same colour). As an example, the given image sensor may have 576 million pixels, wherein 2×2 grids, 3×3 grids or even 4×4 grids of pixels of a same colour can be binned to form a single super pixel. The Bayer CFA is well-known in the art.

As another example, the RGB-IR camera can be a 2×2 pattern-based RGB-IR camera, a 4×4 pattern-based RGB-IR camera, or similar. Alternatively or additionally, optionally, the given camera comprises a multispectral filter arranged in front of the plurality of pixels. Herein, the term "multispectral filter" refers to a type of filter that is capable of selectively transmitting or blocking certain wavelengths of the light incident upon the given image sensor, thereby allowing only specific wavelengths of the light to pass therethrough. The multispectral filter is capable of filtering the light in a wider range of colours (for example, in 16 different colours or even more), as compared to traditional 3-5 colour filters used in any of the aforementioned visible-light cameras. The multispectral filters are well-known in the art.

Throughout the present disclosure, the term "wobulator" refers to a device that is capable of performing sub-pixel shifts. The term "sub-pixel shift" refers to a pixel-level movement (namely, a pixel-level shifting) of the given image sensor in a particular direction for capturing a sub-image with the given image sensor. It is to be understood that different sub-images are captured corresponding to different sub-pixel shifts (as explained later). It will be appreciated that a given sub-pixel shift could be performed, for example, by physically moving the given image sensor and/or its corresponding optics by a given step size in a particular direction, or by optically steering light (incoming towards the given image sensor) by a given step size in a particular direction. The given image sensor and/or its corresponding optics could be physically moved (namely, tilted and/or shifted) by a given wobulator, for example, by way of using an actuator. The optical steering could, for example, be done by way of using a liquid crystal device, a mems-actuated soft polymer, a micromirror, a lens, a liquid lens, adaptive optics and the like. Wobulators are well-known in the art. Information pertaining to step sizes will be explained later.

Notably, the at least one processor controls an overall operation of the imaging system. The at least one processor is communicably coupled to the first image sensor, the second image sensor, the first wobulator, and the second wobulator. Optionally, the at least one processor is implemented as an image signal processor. In an example, the image signal processor may be a programmable digital signal processor (DSP). Alternatively, optionally, the at least one processor is implemented as a cloud server (namely, a remote server) that provides a cloud computing service.

In some implementations, when only one first sub-pixel shift and one second sub-pixel shift are performed by the first wobulator and the second wobulator, respectively, during one cycle, only two consecutive pairs of the first sub-images and the second sub-images are obtained. In other words, two different first sub-images are captured by the first image sensor using the one first sub-pixel shift. From amongst the two different first sub-images, one first sub-image (namely, an initial first sub-image) is captured when the first image sensor is at its actual (namely, original) position (i.e., the one first sub-image is captured when the first image sensor or the light incoming towards the first image sensor has not been shifted yet), and another first sub-image (namely, a latter first sub-image) is captured when the first image sensor or the light incoming towards the first image sensor is shifted (i.e., moved) according to the one first sub-pixel shift. Similarly, two different second sub-images are captured by the second image sensor using the one second sub-pixel shift. From amongst the two different second sub-images, one second sub-image (namely, an initial second sub-image) is captured when the second image sensor is at its actual position, and another second sub-image (namely, a latter second sub-image) is captured when the second image sensor or the light incoming towards the second image sensor is shifted according to the one second sub-pixel shift.

In other implementations, when two first sub-pixel shifts and two second sub-pixel shifts are performed by the first wobulator and the second wobulator, respectively, during one cycle, three consecutive pairs of the first sub-images and the second sub-images are obtained. In other words, three different first sub-images are captured by the first image sensor using the two first sub-pixel shifts. From amongst the three different first sub-images, one first sub-image (namely, an initial first sub-image) is captured when the first image sensor is at its actual position, another first sub-image (namely, an intermediate first sub-image) is captured when the first image sensor or the light incoming towards the first image sensor is shifted according to one of the two first sub-pixel shifts, and yet another first sub-image (namely, a latter first sub-image) is captured when the first image sensor or the light incoming towards the first image sensor is shifted according to another of the two first sub-pixel shifts. Similarly, three different second sub-images are captured by the second image sensor using the two second sub-pixel shifts. From amongst the three different second sub-images, one second sub-image (namely, an initial second sub-image) is captured when the second image sensor is at its actual position, another second sub-image (namely, an intermediate second sub-image) is captured when the second image sensor or the light incoming towards the second image sensor is shifted according to one of the two second sub-pixel shifts, and yet another second sub-image (namely, a latter second sub-image) is captured when the second image sensor or the light incoming towards the second image sensor is shifted according to another of the two second sub-pixel shifts.

Notably, when the given first sub-pixel shift is performed in the first direction, while the given second sub-pixel shift is performed in the second direction, the first image sensor is shifted by a given step size (of the given first sub-pixel shift) along the first direction and the second image sensor is shifted by a given step size (of the given second sub-pixel shift) along the second direction. It will be appreciated that when the second direction is different from the first direction, sub-pixel shifting by the first wobulator and the second wobulator (namely, stereo wobulation) would be performed in a manner that image data pertaining to a given pixel of a given first sub-image of a pair would complement image data pertaining to a corresponding pixel of a given second sub-image of said pair, the given first sub-image and the given second sub-image being captured according to the given first sub-pixel shift and the given second sub-pixel shift, respectively; the given pixel of the given first sub-image and the given pixel of the given second sub-image being located in an overlapping part of a first field of view of the first image sensor and a second field of view of the second image sensor. This would subsequently facilitate in accurately and realistically generating the first image and the second image. In an example, the first direction may be a horizontal direction, while the second direction may be a vertical direction. It will be appreciated that a direction of a given sub-pixel shift is not necessarily a fixed direction for each cycle. In other words, it is not necessary that the given image sensor would always be shifted in the fixed (i.e., same) direction, for example, such as always in a horizontal direction or a vertical direction.

Optionally, the first direction and the second direction are perpendicular to each other. In this regard, the first direction and the second direction are not necessarily fixed directions. In other words, the first direction is not always a horizontal direction, and the second direction is not always a vertical direction, or vice versa. In some implementations, when only one first sub-pixel shift and one second sub-pixel shift are performed during one cycle, the first direction and the second direction could be switched in consecutive cycles. For example, in a first cycle, the first direction may be a horizontal direction, while the second direction may be a vertical direction; in a second cycle, the first direction may be a vertical direction, while the second direction may be a horizontal direction; in a third cycle, the first direction may be a horizontal direction, while the second direction may be a vertical direction; and so on. In other implementations, when two first sub-pixel shifts and two second sub-pixel shifts are performed during one cycle, the first direction and the second direction could be switched in an alternating manner in said cycle. For example, in said cycle, for an initial first sub-pixel shift and an initial second sub-pixel shift, the first direction may be a horizontal direction, while the second direction may be a vertical direction, respectively; and for a latter first sub-pixel shift and a latter second sub-pixel shift, the first direction may be a vertical direction, while the second direction may be a horizontal direction, respectively. It will be appreciated that a given direction (namely, the first direction and/or the second direction) could be any direction (for example, such as a diagonal direction) other than the horizontal direction and the vertical direction.

Optionally, a step size of a given first sub-pixel shift lies in a range from 1 to X, X being equal to a number of pixels of a same colour that lie along the first direction in a smallest repeating M×N array in the first image sensor. In this regard, the step size of the given first sub-pixel shift would be an integer step size, wherein when performing the given first sub-pixel shift, the first image sensor or the light incoming towards the first image sensor is shifted in the first direction by an amount defined by a size of one or more (full) pixels of the same colour along the first direction in the smallest repeating M×N array. In other words, the first image sensor could be shifted along the first direction by one or more complete pixel steps, instead of a fraction of a pixel. Throughout the present disclosure, the term "step size" refers to an amount or a distance by which a given image sensor or the light incoming towards the given image sensor is shifted/moved in a given direction in order to perform a given sub-pixel shift. Lesser the step size of the given sub-pixel shift, greater may be the image quality (for example, in terms of resolution) of an image, and vice versa. The technical benefit of employing such an integer step size of the given first sub-pixel shift is that it facilitates in achieving an effect of demosaicking without having to perform actual (i.e., full and regular) demosaicking on image data of a plurality of pixels of the first image sensor. This is because, in one cycle, the given first sub-pixel shift having a step size of X pixels would facilitate in capturing at least two first sub-images in which a same pixel of the first image sensor receives light from neighbouring 3D points in the real-world environment. This allows for capturing more detailed visual information of the real-world scene in the first image (that is generated from the at least two first sub-images) as compared to when only one first sub-image is captured. Therefore, only a minimal demosaicking may actually be required when processing the first sub-images. This is because although more detailed visual information is captured in the at least two first sub-images as compared to a single image, a minimal amount of demosaicking is required to be performed on the at least two first sub-images so that remaining colour information could also be obtained. Moreover, the aforesaid demosaicking would be performed in a computationally-efficient and time-efficient manner, as it would not be the same as a full conventional demosaicking.

In this way, upon said processing, the first image would be acceptably accurately and realistically generated. The demosaicking is well-known in the art. Typically, a size of a pixel lies in a range of 0.5 micrometres to 2 micrometres.

Optionally, a step size of a given second sub-pixel shift lies in a range from 1 to Y, Y being equal to a number of pixels of a same colour that lie along the second direction in a smallest repeating M×N array in the second image sensor. In this regard, the step size of the given second sub-pixel shift would be an integer step size, wherein when performing the given second sub-pixel shift, the second image sensor or the light incoming towards the second image sensor is shifted in the second direction by an amount defined by a size of one or more (full) pixels of the same colour along the second direction in the smallest repeating M×N array. In other words, the second image sensor would be shifted along the second direction by one or more complete pixel steps, instead of a fraction of a pixel. The technical benefit of employing such an integer step size of the given second sub-pixel shift is that it facilitates in achieving an effect of demosaicking without having to perform actual on image data of a plurality of pixels of the second image sensor. This is because, in one cycle, the given second sub-pixel shift having a step size of Y pixels would facilitate in capturing at least two second sub-images in which a same pixel of the second image sensor receives light from neighbouring 3D points in the real-world environment. This allows for capturing more detailed visual information of the real-world scene in the second image (that is generated from the at least two second sub-images) as compared to when only one second sub-image is captured. Therefore, only a minimal demosaicking may actually be required when processing the second sub-images. This is because although more detailed visual information is captured in the at least two second sub-images as compared to a single image, a minimal amount of demosaicking is required to be performed on the at least two second sub-images so that remaining colour information could also be obtained. In this way, upon said processing, the second image would be acceptably accurately and realistically generated.

Throughout the present disclosure, the term "smallest repeating M×N array" in a given image sensor refers to a smallest array of pixels that is repeated in the given image sensor. The M×N array could, for example, be a 1×1 array, 2×2 array, 2×3 array, a 3×3 array, a 4×4 array, or similar. In an example, for a standard Bayer CFA of the given image sensor, 1 pixel of the same colour lies along the first direction (such as a horizontal direction) and the second direction (such as a vertical direction). Thus, Z would be equal to 1; therefore, the integer step size of the given first sub-pixel shift and the integer step size of the given second sub-pixel shift would only be 1 pixel. In another example, for a quad Bayer CFA of the given image sensor, 2 pixels of the same colour lie along the first direction (such as a horizontal direction) and the second direction (such as a vertical direction). Thus, Z would be equal to 2; therefore, the integer step size of the given first sub-pixel shift and the integer step size of the given second sub-pixel shift may either be 1 pixel or 2 pixels. In yet another example, for a nona Bayer CFA of the given image sensor, 3 pixels of the same colour lie along the first direction (such as a horizontal direction) and the second direction (such as a vertical direction). Thus, Z would be equal to 3; therefore, the integer step size of the given first sub-pixel shift and the integer step size of the given second sub-pixel shift may be any of: 1 pixel, 2 pixels, 3 pixels. In still another example, for a hexadeca Bayer CFA of the given image sensor, Z would be equal to 4; therefore, the integer step size of the first sub-pixel shift and the integer step size of the second sub-pixel shift may be any of: 1 pixel, 2 pixels, 3 pixels, 4 pixels. It will be appreciated that, in this case, when said step sizes are 1 pixel, 2 pixels or 3 pixels (instead of 4 pixels), partial demosaicking would be achieved.

Additionally or alternatively, optionally, a step size of a given first sub-pixel shift is Z pixel, wherein Z is a fraction that lies between 0 and 1. In this regard, the step size of the given first sub-pixel shift would be a fractional step size, wherein when performing the given first sub-pixel shift, the first image sensor or the light incoming towards the first image sensor is shifted in the first direction by an amount defined by a fraction of a size of a pixel. In other words, the first image sensor would be shifted along the first direction by a fraction of said pixel, instead of one or more complete pixel steps (as discussed earlier). The technical benefit of employing such a fractional step size of the given first sub-pixel shift is that it facilitates in providing an apparent spatial super-resolution that is higher than a native resolution of the first image sensor. This is because when the step size of the given first sub-pixel shift is lesser (i.e., fractional), colour information of pixels in the first sub-images per unit area (in a cycle) would be highly comprehensive and realistic (as compared to when the step size of the given first sub-pixel shift would be the integer step size as discussed earlier). Resultantly, the first image would have an extremely high angular resolution. As an example, when the given first sub-pixel shift is performed in a particular direction with a fractional step size, the apparent resolution of the first image would become almost twice the standard resolution of the first image along that particular direction. As an example, when at least one of the step sizes is X pixel, X may be from 0.15, 0.25, 0.4 or 0.5 up to 0.5, 0.8, or 0.9. Optionally, the given step size is 0.5 pixel. It will be appreciated that irrespective of a type of Bayer CFA of the given image sensor (that is, a regular Bayer CFA, a 4C Bayer CFA, a 9C Bayer CFA, or a 16C Bayer CFA), such a fractional step size is necessary for achieving the apparent spatial super-resolution.

Similarly, additionally or alternatively, optionally, a step size of a given second sub-pixel shift is W pixel, wherein W is a fraction that lies between 0 and 1. In this regard, the step size of the given second sub-pixel shift would be a fractional step size, wherein when performing the given second sub-pixel shift, the second image sensor or the light incoming towards the first image sensor is shifted in the second direction by an amount defined by a fraction of a size of a pixel. In other words, the second image sensor would be shifted along the second direction by a fraction of said pixel, instead of one or more complete pixel steps (as discussed earlier). The technical benefit of employing such a fractional step size of the given second sub-pixel shift is that it facilitates in providing an apparent spatial super-resolution that is higher than a native resolution of the second image sensor. This is because when the step size of the given second sub-pixel shift is lesser (i.e., fractional), colour information of pixels in the second sub-images per unit area (in a cycle) would be highly comprehensive and realistic (as compared to when the step size of the given second sub-pixel shift would be the integer step size as discussed earlier). Resultantly, the second image would have an extremely high angular resolution. As an example, when the given second sub-pixel shift is performed in a particular direction with a fractional step size, the apparent resolution of the second image would become almost twice the standard resolution of the second image along that particular direction. As an example, when at least one of the step sizes is W pixel, W may be from 0.15, 0.25, 0.4 or 0.5 up to 0.5, 0.8, or 0.9.

Optionally, step sizes of sub-pixel shifts vary within a same cycle and/or in different cycles. In this regard, different step sizes of the sub-pixel shifts could be employed within the same cycle and/or in the different cycles. It will be appreciated that the step sizes of the sub-pixel shifts vary within the different cycles irrespective of whether a given cycle has one given sub-pixel shift or two given sub-pixel shifts. The technical benefit of employing varying step sizes of the sub-pixel shifts is that it facilitates in both providing an apparent super-resolution in a given image and achieving an effect of demosaicking without having to perform the actual demosaicking on image data of a plurality of pixels of the given image sensor. In an example, for a standard Bayer CFA of the given image sensor, when only one first sub-pixel shift and one second sub-pixel shift are performed during one cycle, a step size of the one first sub-pixel shift and a step size of the one second sub-pixel shift may be 0.5 pixel in a first cycle. Further, the step size of the one first sub-pixel shift and the step size of the one second sub-pixel shift may be 1 pixel in a second cycle. The step size of the one first sub-pixel shift and the step size of the one second sub-pixel shift may be 0.5 pixel in a third cycle. In another example, for a standard Bayer CFA of the given image sensor, when two first sub-pixel shifts and two second sub-pixel shifts are performed during one cycle, a step size of an initial first sub-pixel shift and a step size of an initial second sub-pixel shift may be 0.5 pixel in a first cycle, whereas a step size of a latter first sub-pixel shift and a step size of a latter second sub-pixel shift may be 1 pixel in said first cycle. Moreover, in a second cycle, the step size of the initial first sub-pixel shift and the step size of the initial second sub-pixel shift may be 1 pixel, whereas the step size of the latter first sub-pixel shift and the step size of the latter second sub-pixel shift may be 0.5 pixel.

Notably, the first sub-images are processed to generate the first image and the second sub-images are processed to generate the second image. It will be appreciated that a given image is a visual representation of the real-world environment. The term "visual representation" encompasses colour information represented in the given image, and additionally optionally other attributes associated with the given image (for example, such as depth information, luminance information, transparency information (namely, alpha values), polarization information, and the like).

Optionally, when the first sub-images and the second sub-images, the at least one processor is configured to employ at least one image processing algorithm for performing demosaicking. In this regard, the at least one image processing algorithm is a modified version of image processing algorithms that are well-known in the art for performing the demosaicking. If there were only one sub-image that were processed to generate a given image, standard demosaicking algorithms would be used. On the other hand, if there were four sub-images that were processed to generate the given image, no demosaicking would be required to be performed, because pixel data would be available for all the colours. Thus, employing the at least one image processing algorithm for processing the two or three given sub-images provides a better result (namely, an improved image quality) as compared to the standard demosaicking performed on a single sub-image. The at least one image processing algorithm may also comprise at least one of: an image denoising algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, an image compression algorithm.

Optionally, when processing, the at least one processor is configured to determine a part of a given first sub-image and a part of a given second sub-image that correspond to an overlapping field of view between the first image sensor and the second image sensor, wherein the part of the given first sub-image is processed based on the part of the given second sub-image, and the part of the given second sub-image is processed based on the part of the given first sub-image. In this regard, since the overlapping field of view between the first image sensor and the second image sensor represents a region in the real-world environment that lies in both the first field of view of the first image sensor and the second field of view of the second image sensor, objects or their portions present in said region would be captured in the first field of view and the second field of view, and thus image signals pertaining to such objects or their portions would be captured by some pixels of the first image sensor as well as by some pixels of the second image sensor. Such pixels correspond to the part of the given first sub-image and the part of the given second sub-image. Therefore, missing colour data in the part of the given first sub-image could be reconstructed from colour data available for the part of the given second sub-image, or vice versa. This could be possible because the one or two first sub-pixel shifts and the one or two second sub-pixel shifts are performed in a complementary manner (as discussed earlier). For example, for a given pixel of the part of the given first sub-image, information pertaining to a green colour and a blue colour of the given pixel may be available, but information pertaining to a (missing) red colour of the given pixel may be generated using a red colour of a corresponding pixel of the part of the given second sub-image. Optionally, when determining the part of the given first sub-image and the part of the given second sub-image that correspond to the overlapping field of view, the at least one processor is configured to compare the given first sub-image and the given first sub-image in a pixel-by-pixel manner.

Optionally, the at least one processor is configured to process the first sub-images and the second sub-images of said cycle to generate the first image and the second image, respectively, using at least one neural network, wherein an input of the at least one neural network comprises the first sub-images and the second sub-images. Optionally, the input further comprises information indicative of: respective directions in which the one or two first sub-pixel shifts and the one or two second sub-pixel shifts are performed, respective step sizes of the one or two first sub-pixel shifts and the one or two second sub-pixel shifts. In this regard, an output of the at least one neural network comprises the first image and the second image generated upon processing the first sub-images and the second sub-images, respectively. Since it is not necessary that the respective directions are fixed, and the respective step sizes are also fixed, the information indicative to: the respective directions, the respective step sizes is optionally provided to the at least one neural network. However, when there would be a set/fixed pattern for using the one or two first sub-pixel shifts and the one or two second sub-pixel shifts in each cycle, the information indicative of: the respective directions and the respective step sizes need to be sent to the at least one processor only once, and not repeatedly. As an example, such information may be sent to the at least one processor as metainformation along with the first sub-images and the second sub-images, or may be provided using a code with 8 or lesser number of bits. Thus, the at least one neural network can efficiently utilise even incomplete image data of pixels of the first sub-images and the second sub-images to generate the first image and the second image in an acceptably accurate and realistic manner, as compared to conventional techniques. It will be appreciated that the aforesaid input is provided to the at least one neural network both in a training phase of the at least one neural network and in an inference phase of the at least one neural network (i.e., when the at least one neural is utilised after it has been trained).

It will also be appreciated that when the at least one neural network is used for performing demosaicking on the first sub-images and the second sub-images to generate the first image and the second image, respectively. In addition to this, there could be various image enhancement or image restoration operations (as mentioned hereinbelow) that can be performed additionally and optionally, using the at least one neural network. In this way, the at least one neural network may be trained to generate acceptably accurate image data for generating a given image. These operations can even be performed at different scales or levels of detail to enhance an overall visual quality of the given image. Additionally, optionally, a training process of the at least one neural network involves utilising a loss function that is generated based on perceptual factors and contextual factors. Such a loss function would be different from a loss function utilised in the conventional techniques. Perceptual loss factors may relate to visual perception of the generated given image. Instead of solely considering pixel-level differences, perceptual loss factors aim to measure a similarity in terms of higher-level visual features of an image. Contextual loss factors may take into account a relationship and a coherence between neighbouring pixels in the image. By incorporating the perceptual factors and the contextual factors into the training process, the at least one neural network can produce a visually-pleasing and contextually-coherent result. It will be appreciated that the loss function of the at least one neural network could optionally also take into account various image enhancement/restoration operations in addition to the demosaicking. The various image enhancement/restoration operations may, for example, include at least one of: deblurring, contrast enhancement, low-light enhancement, tone mapping, colour conversion, super-resolution, white balancing, super-resolution, compression.

When evaluating a performance of the at least one neural network and its associated loss function, it can be beneficial to compare the generated image and a ground-truth image at different scales/resolutions. This can be done to assess an image quality and a visual fidelity of the generated image across various levels of detail/resolutions. For instance, the aforesaid comparison can be made at a highest resolution, which represents an original resolution of the image. This allows for a detailed evaluation of pixel-level accuracy of the generated image. Alternatively or additionally, the aforesaid comparison can be made at a reduced resolutions, for example, such as ¼th of the original resolution. This provides an assessment of an overall perceptual quality and ability of the at least one network to capture and reproduce important visual features at coarser levels of detail also. Thus, by evaluating the loss function at different scales, more comprehensive understanding of the performance of the at least one neural network can be known. The loss function, the perceptual factors, and the contextual factors are well-known in the art.

Moreover, optionally, the input of the at least one neural network further comprises information indicative of a resolution (for example, such as in terms of pixels per degree) of the two or three first sub-images and/or the two or three second sub-images. However, when it is already known to the at least one neural network that the given image sensor reads out image data at a particular resolution, the information indicative of the aforesaid resolution may not be required to be provided as the input each time.

Additionally, optionally, pixels per degree (PPD) of a given sub-image could vary spatially, depending on a distortion profile of the given camera. In such a case, pixel density would also vary across a field of view of the given camera. As the PPD could be a function of a pixel location, the PPD could also be indicated by way of pixel locations. It will be appreciated that the PPD of the given sub-image would facilitate the at least one neural network to conveniently and accurately process the given sub-image, for producing a given image. Resultantly, visual information represented in the given image (for example, colours, depths, brightness, and the like, of pixels in a full image frame) would be highly accurate and realistic. Furthermore, information pertaining to the PPD could be stacked/embedded with colour filter information. For example, when an RGGB Bayer CFA is employed, the information pertaining to the PPD may be stacked with each of four colour planes of RGGB Bayer CFA information. By stacking said information with the colour filter information, resulting output would have same spatial dimensions as colour planes of the colour filter array employed.

Optionally, the at least one neural network is any one of: a U-net type neural network, an autoencoder, a pure Convolutional Neural Network (CNN), a Residual Neural Network (ResNet), a Vision Transformer (ViT), a neural network having self-attention layers, a generative adversarial network (GAN). It will be appreciated that a cascade of neural networks could also be employed for processing the first sub-images and the second sub-images of said cycle to generate the first image and the second image, respectively. As an example, two neural networks in said cascade may be employed, wherein a first neural network is a U-net type neural network that is employed for processing the first sub-images and a second neural network is another U-net type neural network that is employed for processing the second sub-images.

Optionally, the at least one neural network has a first path and a second path that are employed to process a given first sub-image and a given second sub-image, respectively, the first path and the second path being parallel paths. In this regard, the at least one neural network employs two distinct parallel processing paths (namely, the first path and the second path) in which separate sequences of operations or layers of the at least one neural network are dedicatedly utilised to process the given first sub-image and the given second sub-image, respectively. The technical benefit of employing the first path and the second path in a parallel manner is that they can operate independently and simultaneously (rather than sequentially), thereby enabling considerably fast and concurrent processing of the first sub-images and the second sub-images. This could potentially facilitate in generating the first image and the second image (upon processing the given first sub-image and the given second sub-image) in real time or near-real time (with minimal latency/delay).

Optionally, the first path and the second path of the at least one neural network are configured to share at least one of: image data pertaining to at least the part of the given first sub-image from the first path to the second path, image data pertaining to at least the part of the given second sub-image from the second path to the first path. It will be appreciated that the aforesaid sharing could be implemented by employing attention modules (for example, such as stereo cross attention modules) in the first path and the second path. Using the attention modules in neural networks is well-known in the art.

It will be appreciated that in order to preserve structural details of neighbouring pixels (for example, such as information pertaining to edges, blobs, high-frequency features, and the like) in a given image (namely, the first image and/or the second image), and to avoid generation of undesirable artifacts in the given image, a gradient loss function (L) could be beneficially employed in a pixel-by-pixel manner. The gradient loss function (L) could, for example, be represented as follows:

$$L = \|\nabla Y - \nabla Y'\| + \|\nabla' Y - \nabla' Y'\|$$

wherein $\nabla$ and $\nabla'$ represent a horizontal gradient operation and a vertical gradient operation, respectively. The gradient loss function (L) measures a discrepancy between gradients of two versions of the same (given) image in both a horizontal direction and a vertical direction. Various gradient loss functions may be employed apart from that mentioned above. As an example, a gradient loss function may comprise masks that selectively exclude or include certain pixels, for example, such as only interpolated pixels would be considered in a calculation of the gradient loss function. By using masks to control inclusion or exclusion of the certain pixels, the gradient loss function can be employed to focus on specific regions or features of interest in the given image. This flexibility allows for more fine-grained control over preservation of the structural details in the given image. Additionally, a directional weighted interpolation technique may be used for performing an interpolation on image data of the given image.

The present disclosure also relates to the method as described above. Various embodiments and variants disclosed above, with respect to the aforementioned imaging system, apply mutatis mutandis to the method.

Optionally, in the method, the first direction and the second direction are perpendicular to each other.

Optionally, in the method, a step size of a given first sub-pixel shift lies in a range from 1 to X, X being equal to a number of pixels of a same colour that lie along the first direction in a smallest repeating M×N array in the first image sensor. Optionally, in the method, a step size of a given second sub-pixel shift lies in a range from 1 to Y, Y being equal to a number of pixels of a same colour that lie along the second direction in a smallest repeating M×N array in the second image sensor.

Optionally, in the method, a step size of a given first sub-pixel shift is Z pixel, wherein Z is a fraction that lies between 0 and 1. Optionally, in the method, a step size of a given second sub-pixel shift is W pixel, wherein W is a fraction that lies between 0 and 1.

Optionally, in the method, step sizes of sub-pixel shifts vary within a same cycle and/or in different cycles.

Optionally, the step of processing comprises determining a part of a given first sub-image and a part of a given second sub-image that correspond to an overlapping field of view between the first image sensor and the second image sensor, wherein the part of the given first sub-image is processed based on the part of the given second sub-image, and the part of the given second sub-image is processed based on the part of the given first sub-image.

Optionally, the method further comprises processing the first sub-images and the second sub-images of said cycle to generate the first image and the second image, respectively, using at least one neural network, wherein an input of the at least one neural network comprises the first sub-images and the second sub-images. Optionally, the input further comprises information indicative of: respective directions in which the one or two first sub-pixel shifts and the one or two second sub-pixel shifts are performed, respective step sizes of the one or two first sub-pixel shifts and the one or two second sub-pixel shifts.

Optionally, in the method, the at least one neural network has a first path and a second path that are employed to process a given first sub-image and a given second sub-image, respectively, the first path and the second path being parallel paths.

DETAILED DESCRIPTION OF THE DRAWINGS

Referring to FIG. 1, illustrated is a block diagram of an architecture of an imaging system 100 incorporating complementing wobulation in stereo cameras, in accordance with an embodiment of the present disclosure. The imaging system 100 comprises a first image sensor 102a, a second image sensor 102b, a first wobulator 104a, a second wobulator 104b, and at least one processor (depicted as a processor 106). The processor 106 is communicably coupled to the first image sensor 102a, the second image sensor 102a, the first wobulator 104a, and the second wobulator 104b. The processor 106 is configured to perform various operations, as described earlier with respect to the aforementioned first aspect.

It may be understood by a person skilled in the art that FIG. 1 includes a simplified architecture of the imaging system 100, for sake of clarity, which should not unduly limit the scope of the claims herein. It is to be understood that the specific implementation of the imaging system 100 is provided as an example and is not to be construed as limiting it to specific numbers or types of image sensors, wobulators, and processors. The person skilled in the art will recognize many variations, alternatives, and modifications of embodiments of the present disclosure.

Figure 2A:
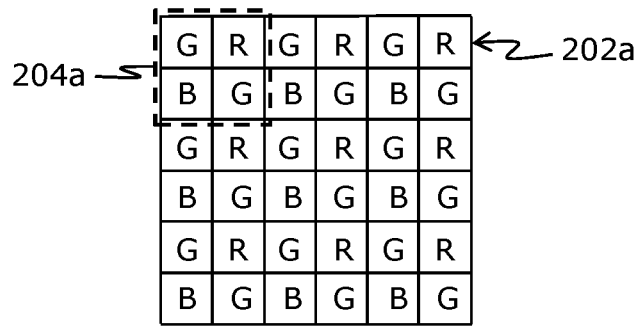
FIGS. 2A and 2B illustrate different examples of colour filter arrays of image sensors having different smallest repeating M×N arrays, in accordance with an embodiment of the present disclosure.
Figure 2B:
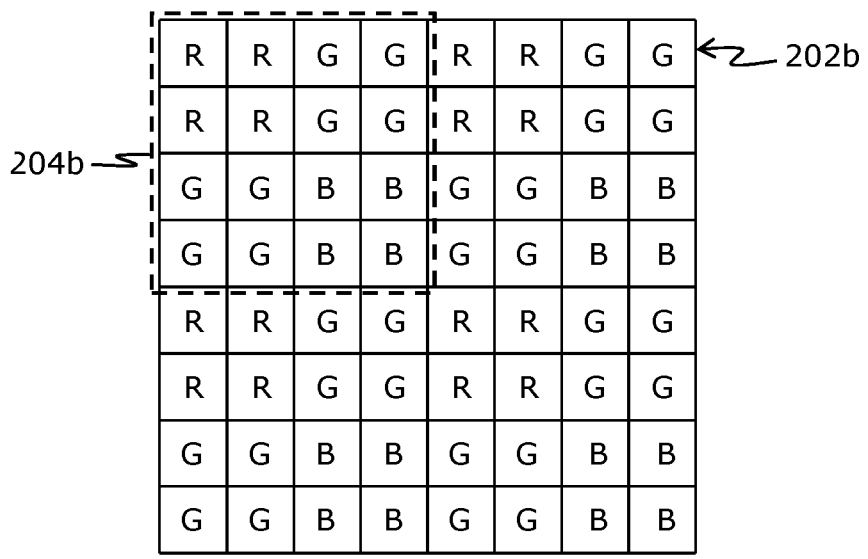

Referring to FIGS. 2A and 2B, illustrated are different examples of colour filter arrays 202a and 202b having different smallest repeating M×N arrays, in accordance with an embodiment of the present disclosure. In FIGS. 2A and 2B, "G" refers to a green colour pixel, "R" refers to a red colour pixel, and "B" refers to a blue colour pixel. With reference to FIG. 2A, a smallest repeating 2×2 array 204a (depicted using a dashed box) of pixels is shown in the colour filter array (CFA) 202a. The CFA 202a is shown as a standard Bayer CFA, wherein the smallest repeating 2×2 array 204a of pixels has two green colour pixels, one red colour pixel, and one blue colour pixel. Herein, only 1 pixel of a same colour lies along a given direction (for example, such as a horizontal direction or a vertical direction) in the smallest repeating 2×2 array 204a.

With reference to FIG. 2B, a smallest repeating 4×4 array 204b (depicted using a dashed box) of pixels is shown in the CFA 202b. The CFA 202b is shown as a quad Bayer CFA, wherein the smallest repeating 4×4 array 204b of pixels has one 2×2 array of red colour pixels, two 2×2 arrays of green colour pixels, and one 2×2 array of blue colour pixels. Herein, 2 pixels of a same colour lie along a given direction (for example, such as a horizontal direction or a vertical direction) in the smallest repeating 4×4 array 204b.

Figure 3:
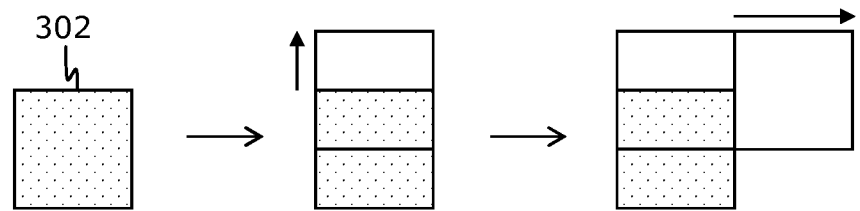
FIG. 3 illustrates how step sizes of sub-pixel shifts vary in a cycle of capturing sub-images, in accordance with an embodiment of the present disclosure.

Referring to FIG. 3, illustrated is how step sizes of sub-pixel shifts vary in a cycle of capturing sub-images, in accordance with an embodiment of the present disclosure. For sake of simplicity and better understanding, a sub-pixel shift of only a single pixel 302 (depicted using a dotted pattern) of an image sensor is shown. In said cycle, two sub-pixel shifts are performed when capturing the sub-images. From amongst the two sub-pixel shifts, a step size of an initial sub-pixel shift (whose direction is depicted using a solid vertical arrow) is 0.5 pixel, i.e., the single pixel 302 is shown to be shifted vertically upwards by an amount defined by a half of a size of the single pixel 302. From amongst the two sub-pixel shifts, a step size of a latter sub-pixel shift (whose direction is depicted using a solid horizontal arrow) is 1 complete pixel, i.e., the single pixel 302 is shown to be shifted horizontally rightwards by an amount defined by the (full) size of the single pixel 302.

Figure 4A:
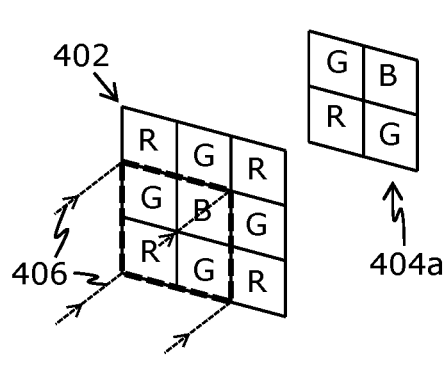
FIGS. 4A, 4B, and 4C illustrate how sub-pixel shifting is performed when capturing three sub-images from a given image sensor, in accordance with an embodiment of the present disclosure.
Figure 4B:
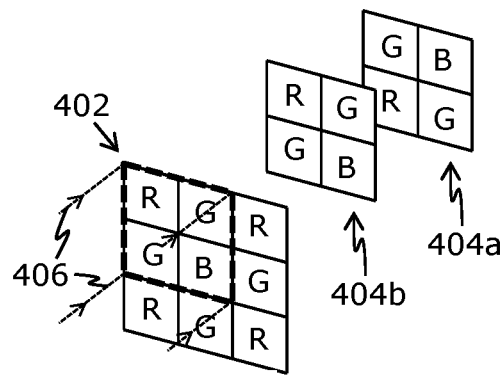
Figure 4C:
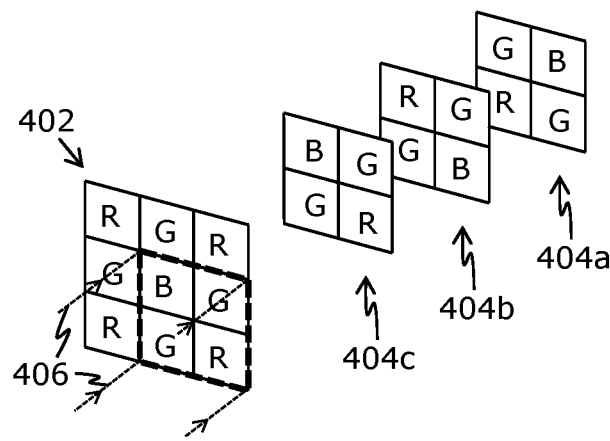

Referring to FIGS. 4A, 4B, and 4C, illustrated is how sub-pixel shifting is performed when capturing three sub-images from a given image sensor 402, in accordance with an embodiment of the present disclosure. For sake of simplicity and better understanding, sub-pixel shifting of only a portion (depicted using a dashed box) of the given image sensor 402 is shown. The given image sensor 402 comprises a standard Bayer colour filter array in which a smallest repeating 2×2 array of pixels has two green colour pixels (depicted using a letter "G"), one red colour pixel (depicted using a letter "R"), and one blue colour pixel (depicted using a letter "B"). As shown, in a single cycle, two sub-pixel shifts are performed by a given wobulator (not shown) for capturing the three sub-images from the given image sensor 402. For capturing the three sub-images, light 406 incoming from a real-world scene of a real-world environment is detected by the portion of the given image sensor 402. With reference to FIG. 4A, an initial sub-image 404a from amongst the three sub-images is captured when the given image sensor 402 is at its existing (i.e., original) position. With reference to FIG. 4B, an intermediate sub-image 404b from amongst the three sub-images is captured when the given image sensor 402 (or the light 406) is shifted by a step size of one complete pixel in a vertically downward direction according to one of the two sub-pixel shifts. With reference to FIG. 4C, a latter sub-image 404c from amongst the three sub-images is captured when the given image sensor 402 (or the light 406) is shifted by a step size of one complete pixel in a diagonally downward direction according to another of the two sub-pixel shifts. Subsequently, the aforesaid three sub-images 404a-c are processed to generate a given image. The given image sensor 402 encompasses at least one of: a first image sensor, a second image sensor. The sub-images 404a-c encompasses at least one of: first sub-images, second sub-images. It will be appreciated that when a given sub-pixel shift occurs in the first image sensor, a different sub-pixel shift occurs in the second image sensor.

Figure 5A:
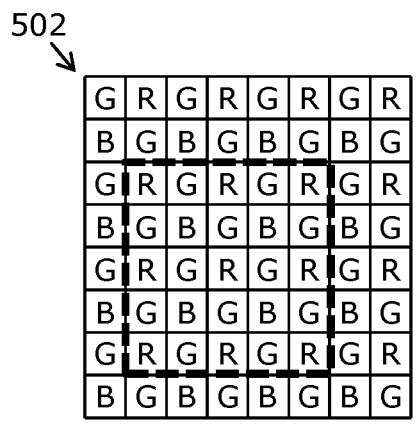
Figure 5C:
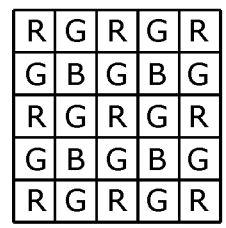
FIGS. 5C and 5D illustrate an initial sub-image and a latter sub-image, respectively, in accordance with an embodiment of the present disclosure.
Figure 5B:
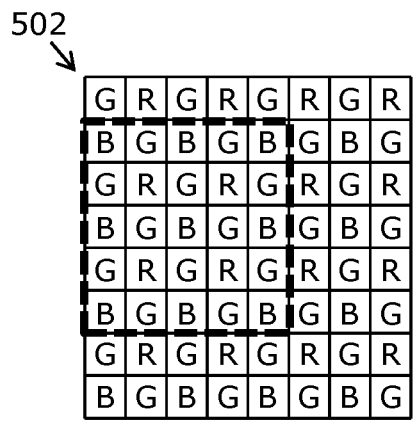
Figure 5D:
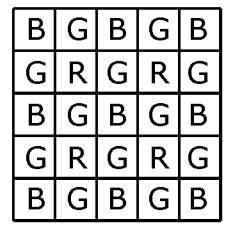

Referring to FIGS. 5A, 5B, 5C, and 5D, FIGS. 5A and 5B illustrate how sub-pixel shifting is performed when capturing two sub-images from a given image sensor 502, while FIGS. 5C and 5D illustrate an initial sub-image 504a and a latter sub-image 504b, respectively, in accordance with an embodiment of the present disclosure. With reference to FIGS. 5A and 5B, for sake of simplicity and better understanding, sub-pixel shifting of only a portion (depicted using a dashed box) of the given image sensor 502 is shown. The given image sensor 502 comprises a standard Bayer colour filter array in which a smallest repeating 2×2 array of pixels has two green colour pixels (depicted using a letter "G"), one red colour pixel (depicted using a letter "R"), and one blue colour pixel (depicted using a letter "B"). As shown, in a single cycle, only one sub-pixel shift is performed by a given wobulator (not shown) for capturing the two sub-images from the given image sensor 502. For capturing the two sub-images, light incoming from a real-world environment are detected by the portion of the given image sensor 502. With reference to FIGS. 5A and 5C, the initial sub-image 504a (as depicted by FIG. 5C) from amongst the two sub-images is captured when the given image sensor 502 is at its existing (i.e., original) position. With reference to FIGS. 5B and 5D, the latter sub-image 504b (as depicted by FIG. 5D) from amongst the two sub-images is captured when the given image sensor 502 (or the light) is shifted by a step size of one complete pixel in a diagonally upward direction according to the one sub-pixel shift. Subsequently, the aforesaid two sub-images 504a-b are processed to generate a given image. The given image sensor 502 encompasses at least one of: a first image sensor, a second image sensor. The sub-images 504a-b encompasses at least one of: first sub-images, second sub-images. It will be appreciated that when a given sub-pixel shift occurs in the first image sensor, a different sub-pixel shift occurs in the second image sensor.

Figures 6A, 6B, 6C:
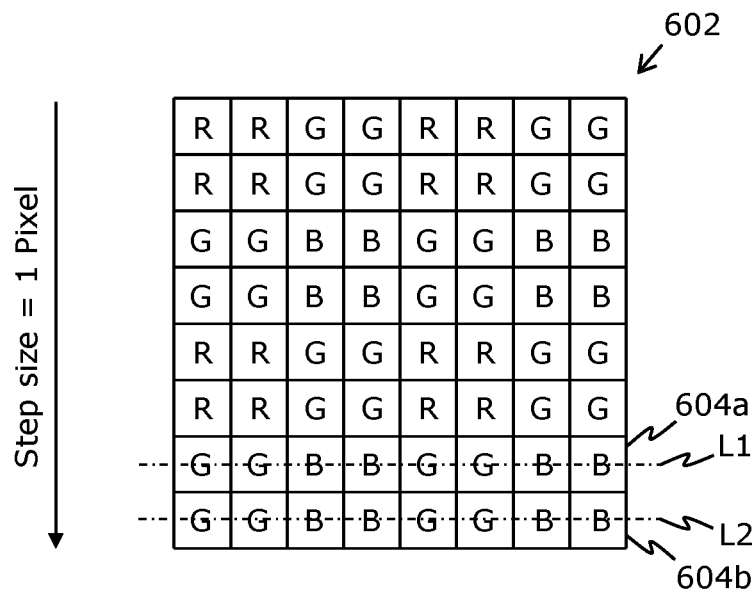
FIGS. 6A, 6B, and 6C illustrate an exemplary scenario of using a step size of one pixel for a sub-pixel shift, in accordance with an embodiment of the present disclosure.

Referring to FIGS. 6A, 6B, and 6C, illustrated is an exemplary scenario of using a step size of one pixel for a sub-pixel shift, in accordance with an embodiment of the present disclosure. With reference to FIG. 6A, a given image sensor 602 is shown to comprise a quad Bayer colour filter array in which a smallest repeating 4×4 array of pixels has one 2×2 array of red colour pixels (depicted using a letter "R"), two 2×2 arrays of green colour pixels (depicted using a letter "G"), and one 2×2 array of blue colour pixels (depicted using a letter "B"). For sake of simplicity and better understanding, the sub-pixel shifting is shown with respect to two reference lines L1 and L2 (depicted using two dash-dot lines) corresponding to two rows 604a and 604b of pixels of the given image sensor 602, respectively. One sub-pixel shift is performed with the step size of the one pixel in a vertically downward direction (depicted using a solid vertical arrow).

With reference to FIG. 6B, a top row indicates the pixels of the row 604a for which image data is captured when the given image sensor 602 is at its existing (i.e., original) position with respect to the reference line L1. A bottom row indicates pixels of a row that is above the row 604a for which image data is captured when the given image sensor 602 is shifted by the step size of one (complete) pixel in the vertically downward direction according to the one sub-pixel shift. In this case, for each of two different colour pixels in the top row and the bottom row, only one colour pixel is missing to obtain complete Red-Green-Blue (RGB) colour information. Thus, only minimal demosaicking is required to be performed to obtain the missing colour.

With reference to FIG. 6C, a top row indicates the pixels of the row 604b for which image data is captured when the given image sensor 602 is at its existing position with respect to the reference line L2. A bottom row indicates the pixels of the row 604a that is above the row 604b for which image data is captured when the given image sensor is shifted by the step size of one (complete) pixel in the vertically downward direction according to the one sub-pixel shift. In this case, for each of two same colour pixels in the top row and the bottom row, two different colour pixels are missing to obtain the complete RGB colour information. Optionally, in such a case, values of the two same colour pixels can be averaged, and employed to achieve a denoising effect. The given image sensor 602 encompasses at least one of: a first image sensor, a second image sensor.

Figures 7A, 7B, 7C, 7D, 7E:
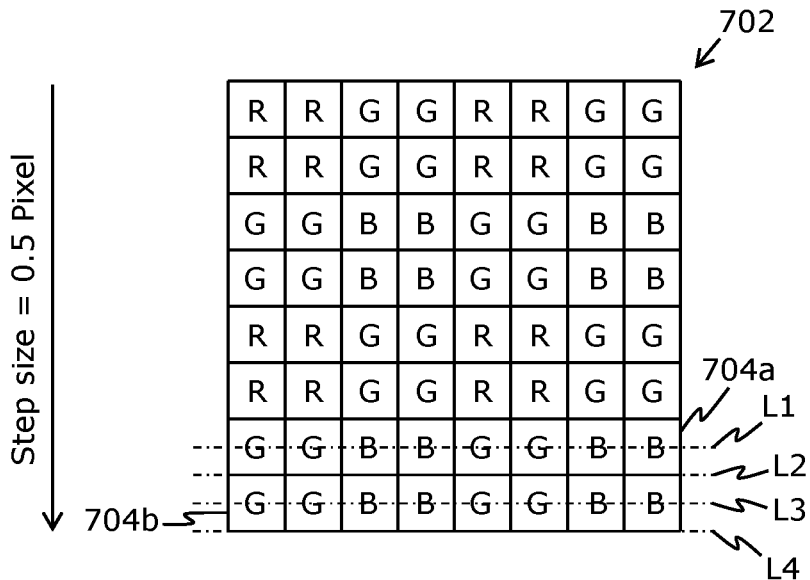
FIGS. 7A, 7B, 7C, 7D, and 7E illustrate an exemplary scenario of using a step size of a half of a pixel for a sub-pixel shift, in accordance with an embodiment of the present disclosure.

Referring to FIGS. 7A, 7B, 7C, 7D, and 7E, illustrated is an exemplary scenario of using a step size of a half of a pixel for a sub-pixel shift, in accordance with an embodiment of the present disclosure. With reference to FIG. 7A, a given image sensor 702 is shown to comprise a quad Bayer colour filter array in which a smallest repeating 4×4 array of pixels has one 2×2 array of red colour pixels (depicted using a letter "R"), two 2×2 arrays of green colour pixels (depicted using a letter "G"), and one 2×2 array of blue colour pixels (depicted using a letter "B"). For sake of simplicity and better understanding, the sub-pixel shifting is shown with respect to four different reference lines L1, L2, L3, and L4 (depicted using four dash-dot lines), wherein the two reference lines L1 and L2 correspond to a row 704a of pixels of the given image sensor 702 while the two reference lines L3 and L4 correspond a row 704b of pixels of the given image sensor 702. One sub-pixel shift is performed with the step size of the half of the pixel (namely, 0.5 pixel) in a vertically downward direction (depicted using a solid vertical arrow).

With reference to FIG. 7B, a top row indicates the pixels of the row 704a for which image data is captured when the given image sensor 702 is at its existing (i.e., original) position with respect to the reference line L1. A bottom row indicates pixels of a row that is above the row 704a for which image data is captured when the given image sensor 702 is shifted by the step size of 0.5 pixel in the vertically downward direction according to the one sub-pixel shift. In this case, for each of two different colour pixels in the top row and the bottom row R2, only one colour pixel is missing to obtain complete Red-Green-Blue (RGB) colour information. Thus, only minimal demosaicking is required to be performed to obtain the missing colour.

With reference to FIG. 7C, a top row indicates the pixels of the row 704a for which image data is captured when the given image sensor 702 is at its existing position with respect to the reference line L2. A bottom row indicates the pixels of the (same) row 704a for which image data is captured when the given image sensor is shifted by the step size of 0.5 pixel in the vertically downward direction according to the one sub-pixel shift. In this case, for each of two same colour pixels in the top row and the bottom row, two different colour pixels are missing to obtain the complete RGB colour information. Optionally, in such a case, values of the two same colour pixels can be averaged, and employed to achieve a denoising effect.

With reference to FIGS. 7D and 7E, a top row indicates the pixels of the row 704b for which image data is captured when the given image sensor 702 is at its existing position with respect to the reference lines L3 and L4. A bottom row indicates the pixels of the (same) row 704b for which image data is captured when the given image sensor is shifted by the step size of 0.5 pixel in the vertically downward direction according to the one sub-pixel shift. In this case also, for each of two same colour pixels in the top row and the bottom row, two different colour pixels are missing to form the complete RGB colour information. Optionally, in such a case, values of the two same colour pixels can be averaged, and employed to achieve a denoising effect. The given image sensor 702 encompasses at least one of: a first image sensor, a second image sensor.

Figures 8A, 8B:
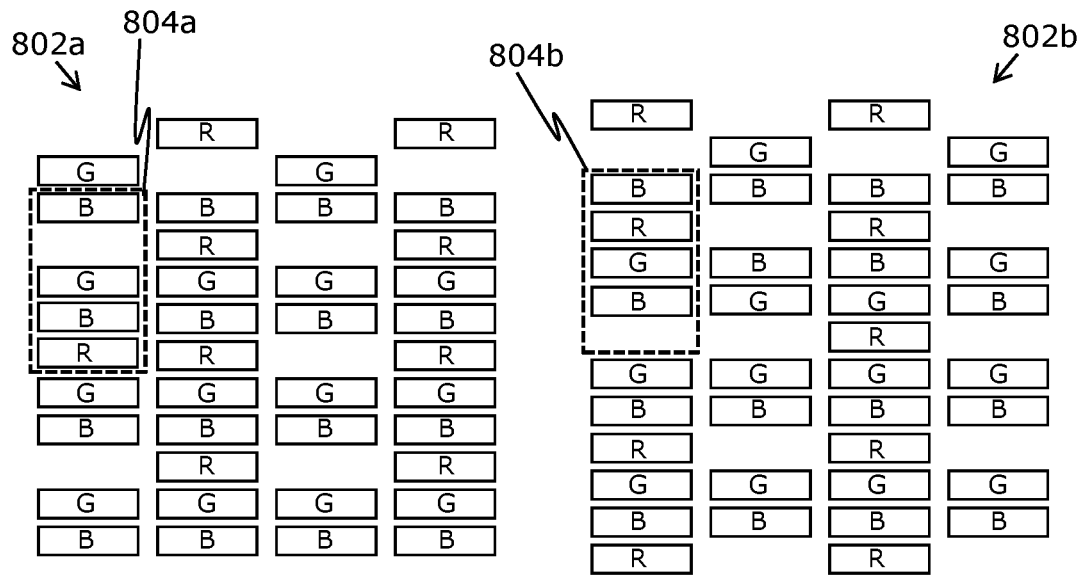

Referring to FIGS. 8A and 8B, FIG. 8A illustrates a part 802a of a first sub-image of a pair, while FIG. 8B illustrates a part 802b of a second sub-image of the pair, in accordance with an embodiment of the present disclosure. In FIGS. 8A and 8B, "G" refers to a green colour pixel, "R" refers to a red colour pixel, and "B" refers to a blue colour pixel. With reference to FIGS. 8A and 8B, the part 802a of the first sub-image and the part 802b of the second sub-image correspond to an overlapping field of view between a first image sensor and a second image sensor, wherein the first image sensor is used for capturing the first sub-image, and the second image sensor is used for capturing the second sub-image. As an example, some colour information for pixels 804a is missing in the part 802a of the first sub-image, and is available from corresponding pixels 804b of the part 802b of the second sub-image, and vice versa. In such a case, the part 802a of the first sub-image is processed based on the part 802b of the second sub-image, and the part 802b of the second sub-image is processed based on the part 802a of the first sub-image.

FIGS. 2A-2B, 3, 4A-4C, 5A-5D, 6A-6C, 7A-7E, and 8A-8B are merely examples, which should not unduly limit the scope of the claims herein. The person skilled in the art will recognize many variations, alternatives, and modifications of embodiments of the present disclosure.

Figure 9:
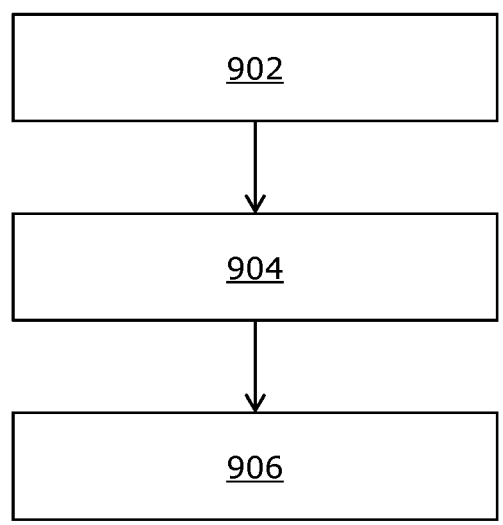
FIG. 9 illustrates steps of a method incorporating complementing wobulation in stereo cameras, in accordance with an embodiment of the present disclosure.

Referring to FIG. 9, illustrated are steps of a method incorporating complementing wobulation in stereo cameras, in accordance with an embodiment of the present disclosure. At step 902, in a cycle, two or three consecutive pairs of first sub-images and second sub-images are obtained from a first image sensor and a second image sensor, respectively, wherein the first image sensor and the second image sensor form a stereo pair. At step 904, a first wobulator and a second wobulator are controlled to perform one or two first sub-pixel shifts and one or two second sub-pixel shifts when capturing the first sub-images and the second sub-images during said cycle, respectively, wherein a given first sub-pixel shift is performed in a first direction, while a given second sub-pixel shift is performed in a second direction that is different from the first direction. At step 906, the first sub-images and the second sub-images of said cycle are processed, to generate a first image and a second image, respectively.

The aforementioned steps are only illustrative and other alternatives can also be provided where one or more steps are added, one or more steps are removed, or one or more steps are provided in a different sequence without departing from the scope of the claims herein.

What is claimed is:

1. An imaging system comprising:
    a first image sensor and a second image sensor, forming a stereo pair;
    a first wobulator and a second wobulator that are to be employed to perform sub-pixel shifts when capturing images with the first image sensor and the second image sensor, respectively; and
    at least one processor configured to:
        obtain, in a cycle, two or three consecutive pairs of first sub-images and second sub-images from the first image sensor and the second image sensor, respectively;
        control the first wobulator and the second wobulator to perform, during said cycle, one or two first sub-pixel shifts and one or two second sub-pixel shifts, respectively, wherein a given first sub-pixel shift is performed in a first direction, while a given second sub-pixel shift is performed in a second direction that is different from the first direction; and
        process the first sub-images and the second sub-images of said cycle, to generate a first image and a second image, respectively.

2. The imaging system of claim 1, wherein the first direction and the second direction are perpendicular to each other.

3. The imaging system of claim 1, wherein a step size of a given first sub-pixel shift lies in a range from 1 to X, X being equal to a number of pixels of a same colour that lie along the first direction in a smallest repeating M×N array in the first image sensor.

4. The imaging system of claim 1, wherein a step size of a given second sub-pixel shift lies in a range from 1 to Y, Y being equal to a number of pixels of a same colour that lie along the second direction in a smallest repeating M×N array in the second image sensor.

5. The imaging system of claim 1, wherein a step size of a given first sub-pixel shift is Z pixel, wherein Z is a fraction that lies between 0 and 1.

6. The imaging system of claim 1, wherein a step size of a given second sub-pixel shift is W pixel, wherein W is a fraction that lies between 0 and 1.

7. The imaging system of claim 1, wherein step sizes of sub-pixel shifts vary within a same cycle and/or in different cycles.

8. The imaging system of claim 1, wherein, when processing, the at least one processor is configured to determine a part of a given first sub-image and a part of a given second sub-image that correspond to an overlapping field of view between the first image sensor and the second image sensor, wherein the part of the given first sub-image is processed based on the part of the given second sub-image, and the part of the given second sub-image is processed based on the part of the given first sub-image.

9. The imaging system of claim 1, wherein the at least one processor is configured to process the first sub-images and the second sub-images of said cycle to generate the first image and the second image, respectively, using at least one neural network, wherein an input of the at least one neural network comprises the first sub-images and the second sub-images, and wherein the input optionally comprises information indicative of: respective directions in which the one or two first sub-pixel shifts and the one or two second sub-pixel shifts are performed, respective step sizes of the one or two first sub-pixel shifts and the one or two second sub-pixel shifts.

10. The imaging system of claim 9, wherein the at least one neural network has a first path and a second path that are employed to process a given first sub-image and a given second sub-image, respectively, the first path and the second path being parallel paths.

11. A method comprising:
  obtaining, in a cycle, two or three consecutive pairs of first sub-images and second sub-images from a first image sensor and a second image sensor, respectively, wherein the first image sensor and the second image sensor form a stereo pair;
  controlling a first wobulator and a second wobulator to perform one or two first sub-pixel shifts and one or two second sub-pixel shifts when capturing the first sub-images and the second sub-images during said cycle, respectively, wherein a given first sub-pixel shift is performed in a first direction, while a given second sub-pixel shift is performed in a second direction that is different from the first direction; and
  processing the first sub-images and the second sub-images of said cycle, to generate a first image and a second image, respectively.

12. The method of claim 11, wherein the first direction and the second direction are perpendicular to each other.

13. The method of claim 11, wherein step sizes of sub-pixel shifts vary within a same cycle and/or in different cycles.

14. The method of claim 11, wherein the step of processing comprises determining a part of a given first sub-image and a part of a given second sub-image that correspond to an overlapping field of view between the first image sensor and the second image sensor, wherein the part of the given first sub-image is processed based on the part of the given second sub-image, and the part of the given second sub-image is processed based on the part of the given first sub-image.

15. The method of claim 11, the step of processing the first sub-images and the second sub-images of said cycle to generate the first image and the second image, respectively, is performed using at least one neural network, wherein an input of the at least one neural network comprises the first sub-images and the second sub-images, and wherein the input optionally comprises information indicative of: respective directions in which the one or two first sub-pixel shifts and the one or two second sub-pixel shifts are performed, respective step sizes of the one or two first sub-pixel shifts and the one or two second sub-pixel shifts.

* * * * *